(No Model.)

B. MERRITT.
ATTACHMENT FOR BELT IDLERS.

No. 258,242. Patented May 23, 1882.

WITNESSES
Charles Spaulding
W. Lithgow Willey

INVENTOR
Benjamin Merritt
Per Frank G. Parker, atty.

UNITED STATES PATENT OFFICE.

BENJAMIN MERRITT, OF NEWTON, MASSACHUSETTS.

ATTACHMENT FOR BELT-IDLERS.

SPECIFICATION forming part of Letters Patent No. 258,242, dated May 23, 1882.

Application filed March 24, 1882. (No model.)

*To all whom it may concern:*

Be it known that I, BENJAMIN MERRITT, a citizen of the United States, residing at Newton, in the county of Middlesex and State of Massachusetts, have invented a certain new and useful Improved Attachment for Belt-Idlers, of which the following is a specification.

My invention has for its object the combination of an arm extending from the idler-frame in near contact with the belt, and so located in connection with a fixed arm, also near the belt, that when the idler-frame is moved to slack the belt then the arm on the frame will, in connection with the stationary arm, grip the belt and instantly stop it. I attain this object by the mechanism illustrated in the accompanying drawings, in which—

Figure 1:
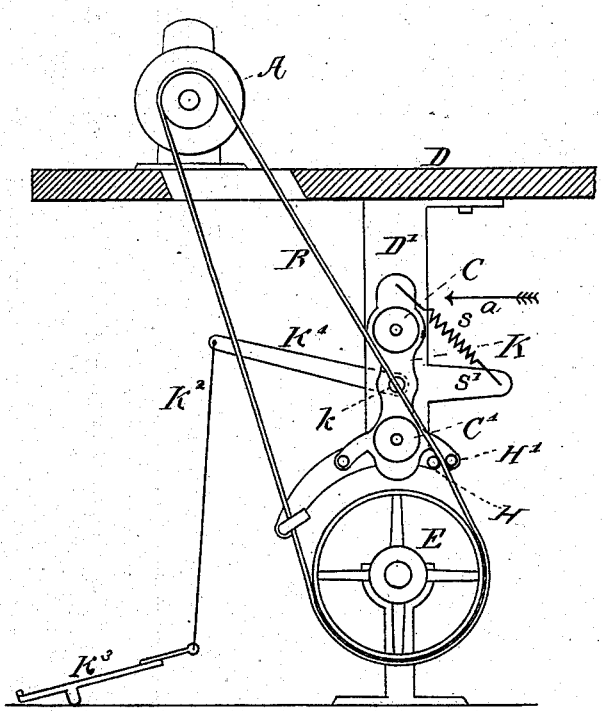
Figure 2:
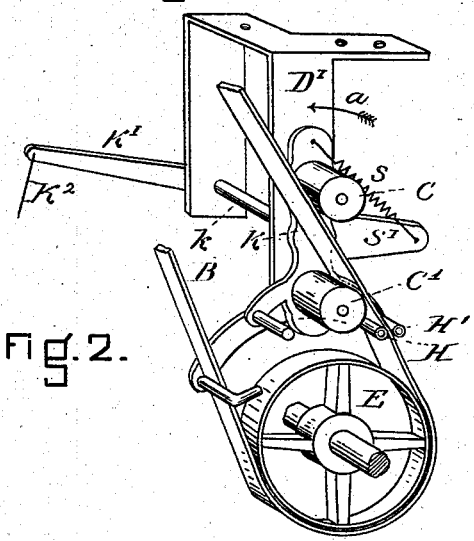

Figure 1 is a side elevation of a machine to which my invention is attached. Fig. 2 is a perspective view, showing my invention and the connecting parts.

In the drawings, Fig. 1, E represents the driving-pulley; A, the pulley being driven; B, the belt, and D the table or bench to which the machine is attached.

D′, Figs. 1 and 2, is a hanger connected to the table D. $k$ is a rocker-shaft supported by the hanger D′. To one end of this rocker-shaft $k$ I attach the rocker-plate K, and to the other end the lever K′, said lever K′ being connected by the rod $K^2$ to a pedal-lever, $K^3$. Upon the rocker-plate K are pivoted two idler-rollers, C and C′, these idler-rollers being on the opposite sides of the belt B, and so arranged that when the said rocker-plate K is moved by the action of the pedal-lever $K^3$ in the direction indicated by the arrow $a$ the slack of the belt will be taken up and the motion of the wheel E will be transmitted through the belt B to the wheel A.

H is an arm projecting from the hanger D′, and located in close proximity to the belt B, but not touching it, when the belt B is thrown into working position by the idlers C and C′, as above described.

H′ is an arm attached to the rocker-plate K, so as to partake of the bodily movements of the idlers C and C′, and is so located in relation to the fixed arm H that when the rocker-plate K is thrown into such a position as to remove the idlers C and C′ from the belt B, and thus slack it, the arm H′, in connection with the stationary arm H, will grip the belt B and instantly stop it.

S is a spring attached to the upper end of the rocker-plate K, and sustained by the fixed arm S′, the spring S serving to throw the rocker-plate K into the position shown in Fig. 1, so as to slack the belt, and at the same time grip it, as has been set forth.

I claim as my invention—

The combination of the rocker-plate K, the idlers C C′, and the arm H′ with the stationary arm H and the belt B, all operating together substantially as described, and for the purpose set forth.

BENJAMIN MERRITT.

Witnesses:
FRANK G. PARKER,
W. LITHGOW WILLEY.